United States Patent
Viola et al.

(10) Patent No.: US 8,427,137 B2
(45) Date of Patent: Apr. 23, 2013

(54) MAGNETOSTRICTIVE DISPLACEMENT TRANSDUCER WITH SUPPRESSION OF SWITCHING POWER SUPPLY NOISE

(75) Inventors: Uwe Viola, Cary, NC (US); Aleksey Minin, Cary, NC (US); Frank Kraehe, Cary, NC (US)

(73) Assignee: MTS Systems Corporation, Eden Prairie, MN (US)

( * ) Notice: Subject to any disclaimer, the term of this patent is extended or adjusted under 35 U.S.C. 154(b) by 1438 days.

(21) Appl. No.: 11/956,427

(22) Filed: Dec. 14, 2007

(65) Prior Publication Data

US 2009/0154292 A1 Jun. 18, 2009

(51) Int. Cl.
*G01B 7/14* (2006.01)

(52) U.S. Cl.
USPC .............................. 324/207.13; 324/207.24

(58) Field of Classification Search .............. 324/207.13
See application file for complete search history.

(56) References Cited

U.S. PATENT DOCUMENTS

| | | | |
|---|---|---|---|
| 4,404,523 A * | 9/1983 | Hughes et al. .......... | 324/207.13 |
| 4,636,999 A * | 1/1987 | Lygas ........................ | 367/156 |
| 4,721,902 A | 1/1988 | Tellerman et al. ......... | 324/58.5 |
| 5,043,685 A | 8/1991 | Nyce ........................... | 333/148 |
| 5,070,485 A | 12/1991 | Nyce ........................... | 367/127 |
| 5,206,586 A | 4/1993 | Yauch et al. .............. | 324/207.13 |
| 5,212,444 A | 5/1993 | Abramovich et al. | |
| 5,303,212 A | 4/1994 | Sugiyama | |
| 5,334,933 A | 8/1994 | Tellerman ............... | 324/207.13 |
| 5,457,620 A | 10/1995 | Dromgoole | |
| 5,590,091 A | 12/1996 | Gloden et al. ............. | 367/140 |
| 5,640,109 A | 6/1997 | Nyce ........................... | 327/73 |
| 5,914,841 A * | 6/1999 | Heo et al. .................... | 361/18 |
| 5,952,823 A | 9/1999 | Nyce et al. ............. | 324/207.13 |
| 6,369,563 B1 | 4/2002 | Krahe et al. ............. | 324/207.13 |
| 6,426,618 B1 | 7/2002 | Nyce et al. ............. | 324/207.13 |
| 6,528,990 B1 | 3/2003 | Nyce ........................ | 324/207.13 |
| 6,600,310 B2 | 7/2003 | Nyce et al. ............. | 324/207.23 |
| 6,600,962 B1 | 7/2003 | Johnson et al. ............. | 700/66 |
| 6,707,290 B2 | 3/2004 | Nyce et al. ............. | 324/207.13 |
| 6,791,427 B1 | 9/2004 | Nyce ........................... | 331/143 |
| 6,810,754 B2 | 11/2004 | May | |
| 7,292,025 B2 | 11/2007 | Sprecher .................. | 324/207.13 |
| 7,598,732 B2 * | 10/2009 | Hackner et al. .......... | 324/207.13 |

(Continued)

FOREIGN PATENT DOCUMENTS

WO WO 98/45932 10/1998

OTHER PUBLICATIONS

Official Search Report of the US Patent Office in counterpart foreign application No. PCT/US2008/013390 filed Dec. 5, 2008.

(Continued)

*Primary Examiner* — Patrick Assouad
*Assistant Examiner* — David M. Schindler
(74) *Attorney, Agent, or Firm* — Steven M. Koehler; Westman, Champlin & Kelly P.A.

(57) ABSTRACT

A transducer senses repetitive pulses on a magnetostrictive element and provides transducer output bursts. A transducer circuit detects the transducer output bursts. An energy storage device couples to a power input of the transducer circuit. A switching power supply couples to the energy storage device and has repetitive suppressed states during which switching in the switching power supply is suppressed. A sequence circuit provides synchronization of the repetitive suppressed states of the switching power supply with the transducer output bursts.

18 Claims, 10 Drawing Sheets

U.S. PATENT DOCUMENTS

| | | | |
|---|---|---|---|
| 2004/0056652 A1* | 3/2004 | Bomya | 324/207.17 |
| 2005/0212510 A1* | 9/2005 | Kirchdoerffer et al. | 324/207.15 |
| 2006/0247526 A1 | 11/2006 | Lee et al. | |
| 2007/0002510 A1* | 1/2007 | Baurle et al. | 361/94 |
| 2007/0240504 A1 | 10/2007 | Barr et al. | 73/290 |
| 2009/0140728 A1* | 6/2009 | Rollins et al. | 324/207.16 |

OTHER PUBLICATIONS

Chinese Office Action issued for patent application 200880120636.2, Dec. 21, 2011.

\* cited by examiner

MAGNETOSTRICTIVE DISPLACEMENT TRANSDUCER WITH SUPPRESSION OF SWITCHING POWER SUPPLY NOISE

BACKGROUND

The discussion below is merely provided for general background information and is not intended to be used as an aid in determining the scope of the claimed subject matter.

Magnetostrictive displacement transducers are typically mounted to industrial equipment for use in sensing displacement of a machine part or displacement of a level sensing float. Magnetostrictive displacement electronics are typically enclosed in a housing mounted to a machine or a tank. As the range of applications of magnetostrictive displacement transducers expands, there is a desire to sample displacement at higher and higher data rates and lower displacement jitter levels, which leads to increasing power consumption. In the past, linear power supply regulators have been used in the housing, however, with increasing data rates, heating in the housings became excessive. Switching power supply regulators have been used to reduce heating, however, switching noise generated by the switching regulator has undesirably increased jitter levels. The switching of the switching regulator is autonomous, variable and not synchronized with other circuit blocks, and thus the time of a switch noise pulse is not predictable. There is a desire for a high resolution, stable, low jitter displacement measurement in a magnetostrictive displacement transducer that uses a switching power supply regulator in the housing.

SUMMARY

This Summary and the Abstract are provided to introduce some concepts in simplified forms that are further described below in the Detailed Description. The Summary and Abstract are not intended to identify key features or essential features of the claimed subject matter, nor are they intended to be used as an aid in determining the scope of the claimed subject matter. In addition, the description herein provided and the claimed subject matter should not be interpreted as being directed to addressing any of the short-comings discussed in the Background.

Disclosed is a transducer assembly. The transducer assembly comprises a transducer. The transducer senses repetitive pulses on a magnetostrictive element and provides transducer output bursts.

The transducer assembly comprises a transducer circuit. The transducer circuit repetitively detects the transducer output bursts and provides an output representative of displacement.

The transducer assembly comprises an energy storage device. The energy storage device couples to a power input of the transducer circuit. The transducer assembly comprises a switching power supply. The switching power supply couples to the energy storage device. The switching power supply has repetitive suppressed states during which switching in the switching power supply is suppressed.

In a further embodiment, the transducer assembly comprises a sequence circuit. The sequence circuit couples to the switching power supply and to the transducer circuit. The sequence circuit provides synchronization of the repetitive suppressed states of the is switching power supply with the transducer output bursts.

DETAILED DESCRIPTION

In the embodiments described below, a magnetostrictive transducer assembly includes a switching power supply that generates switching noise. When a transducer circuit in the magnetostrictive transducer assembly receives a first part of a transducer burst, the switching in the switching power supply is momentarily suppressed in order to provide a low noise time interval for detecting the timing of a later part of the transducer burst crossing a bias level. An energy storage device provides power to the transducer circuit while the switching is suppressed. After timing is detected, the switching power supply returns to unsuppressed operation. Jitter in an output of the magnetostrictive transducer assembly is reduced, and resolution is improved. Various aspects will be discussed that individually or in combination comprise embodiments of the present invention.

Figure 1:
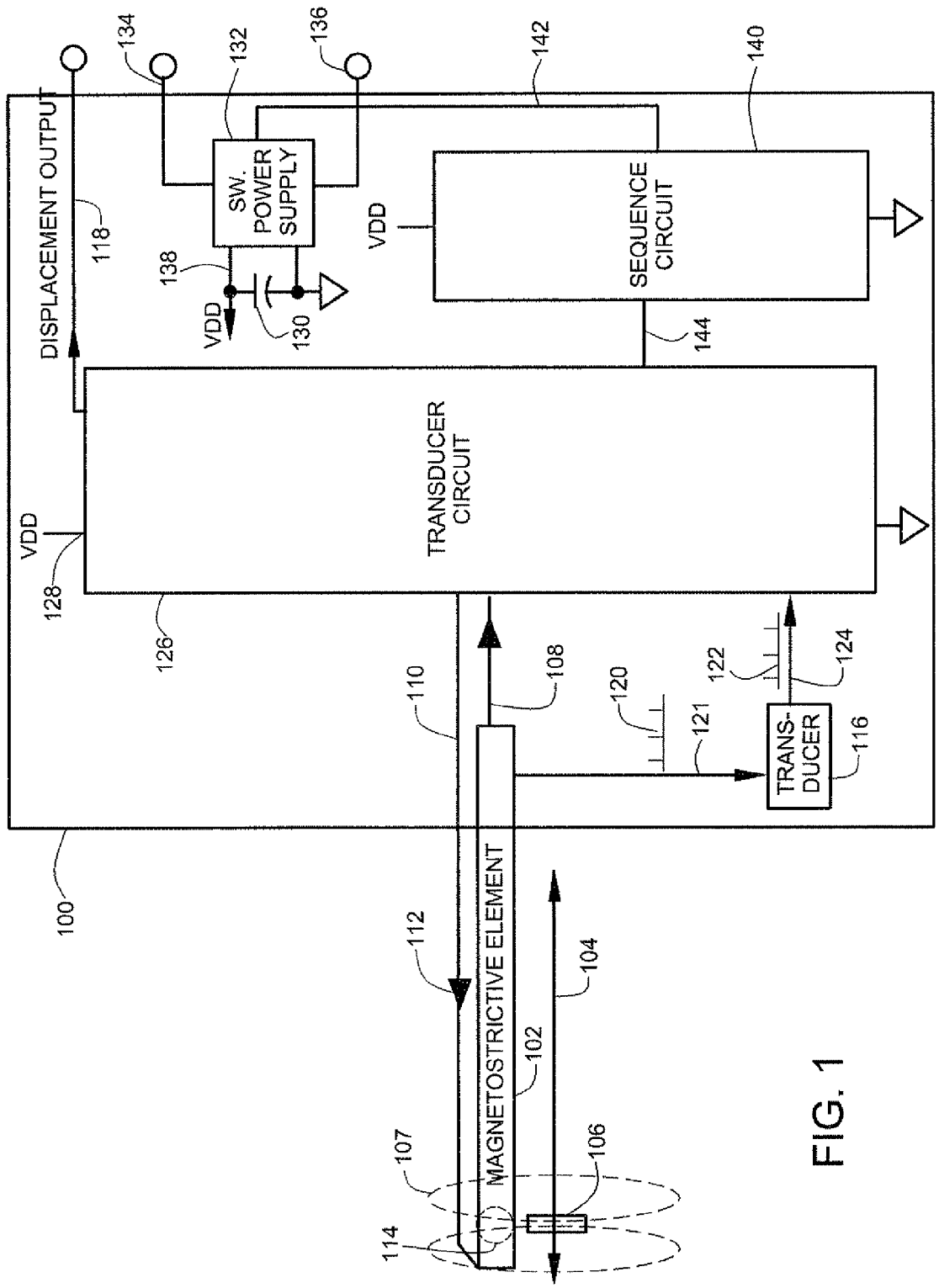
FIG. 1 illustrates a transducer assembly.

FIG. 1 illustrates a transducer assembly 100 coupled to a magnetostrictive element 102. The magnetostrictive element 102 extends alongside a displacement path 104 of a magnet 106 and senses displacement of the magnet 106. The magnet 106 is attached to a moving part such as a moving machine part or a moving float in a tank (not illustrated). The magnet 106 moves relative to the magnetostrictive element 102. The magnetostrictive element 102 extends to the transducer assembly 100. Electrical leads 108, 110 provide a series of repetitive electric current pulses 112 that flow along the length of the magnetostrictive element 102.

The magnet 106 produces an external magnetic field 107 that extends to the magnetostrictive element 102. The external magnetic field 107 magnetizes an adjacent local region 114 in a first direction approximately transverse to the length of the magnetostrictive element 102. As the current pulses 112 pass through the magnetostrictive element 102, the current pulses produce an internal magnetic field in the magnetostrictive element 102. The internal magnetic field is sufficiently large to overcome the external magnetic field 107 from magnet 106, and the magnetization in the local region 114 abruptly changes direction from an approximately transverse direction to an approximately concentric direction around a major axis of the magnetostrictive element 102. Due to the magnetostrictive properties of the magnetostrictive element 102, the abrupt change in magnetic field direction produces a corresponding abrupt local dimension change (mechanical pulse) of the magnetostrictive element 102.

The mechanical pulse travels along the length of the magnetostrictive element 102 at sonic speed from the local region 114 to the transducer assembly 100 where the pulse is detected by a transducer 116. The magnetostrictive element 102 functions as a sonic delay line. A time delay between application of an electrical pulse 112 and the detection of the mechanical pulse at transducer 116 is representative of displacement (position) of the magnet 106. The transducer 116 can comprise a bias magnet and a coil wound around a tape core, a coil without a core, a piezoelectric sensor, a magnetoresistive sensor, a giant magnetoresistive (GMR) sensor, a hall effect sensor, a SQUID sensor or other know sensor that can detect the pulse. The transducer 116 can sense a magnetic or a mechanical disturbance of the magnetostrictive element 102. The transducer assembly 100 includes electronic circuitry that generates the repetitive pulse 112, measures the time delay, and provides a displacement output 118 that is representative of displacement of the magnet 106. According to one aspect, the displacement output 118 comprises a digital bus signal according to a digital communication protocol such as Profibus, Canbus or other known digital communication protocol. According to another aspect, the displacement output 118 comprises an analog output such as a controlled analog current or a controlled analog voltage. According to yet another aspect the displacement output 118 comprises a simple digital output such as a pulse width modulated (PMW) output, a frequency output or a start/stop output.

The transducer assembly 100 comprises the transducer 116 that senses repetitive pulses 120 on line 121 from the magnetostrictive element 102. The transducer 116 provides transducer output bursts 122 at a transducer output 124. The term "burst" as used in this application refers to a waveform that comprises a group of a few sinusoidal cycles that are typically at the same frequency. The burst waveform typically has a damped envelope. Each group corresponds with a single electrical pulse 112.

The transducer output 124 couples to a transducer circuit 126. The transducer circuit 126 repetitively detects the transducer output bursts 122. The transducer circuit 126 provides the output 118 that is representative of displacement.

The transducer circuit 126 comprises a power input 128. A capacitor 130 has a voltage VDD, and the voltage VDD couples to the power input 128. The capacitor 130 is a kind of energy storage device. As alternatives to the capacitor 130, other kinds of energy storage devices such as supercapacitors (also called ultracapacitors), rechargeable batteries or inductors can be used as well with appropriate adaptation to associated circuitry. The transducer assembly 100 comprises a switching power supply 132. The switching power to supply 132 is energized at conductors 134, 136 from an external electrical power source. According to one aspect, the external electrical power source comprises a communication bus associated with a communication bus of the displacement output 118. The switching power supply 132 couples power to the capacitor 130 along line 138. The switching power supply 132 has repetitive suppressed states during which switching in the switching power supply 132 is suppressed. When the switching power supply 132 is in a non-suppressed state, the switching power supply 132 provides power to the capacitor 130 and produces an undesired level of switching power supply noise. When the switching power supply 132 is in a suppressed state, the switching is suppressed, provision of power to the capacitor 130 is suppressed, and the switching power supply 132 does not produce an undesired high level of switching power supply noise. If unsuppressed switching power supply noise were present at the transducer output 124, it would adversely affect the repeatability of detection of output bursts 122. The capacitor 130, which is an energy storage device, provides stored power to the transducer circuit 126 during the repetitive suppressed states. The transducer circuit 126 continues to operate on energy stored in the capacitor 130 during the suppressed states. According to one aspect the capacitor 130 has an energy storage capacity sufficient to energize the transducer circuit 126 through a time interval between one or two successive transducer output bursts.

According to one aspect, the switching power supply 132 comprises a disable input and is suppressed by applying a switching control output 142 to the disable input, shutting off the switching power supply 132. According to another aspect, the switching power supply 132 is suppressed by reducing the power output of the switching power supply 132. According to yet another aspect, the switching power supply 132 is suppressed by reducing the frequency of switching of the switching power supply 132.

The transducer assembly 100 comprises a sequence circuit 140. The sequence circuit 140 couples a switching control output 142 to the switching power supply 132. The sequence circuit 140 couples to the transducer circuit 126 along control bus 144. The sequence circuit 140 provides synchronization of the repetitive suppressed states of the switching power supply 132 with the repetitive detecting of the transducer output bursts 122 by the transducer circuit 126. Synchronization ensures that the time of the detecting is during the suppressed state such that high levels of switching noise are not present at the time of the detecting.

According to one aspect, the synchronization provided by the sequence circuit 140 suppresses switching power supply noise during a time interval in which the transducer circuit 126 detects the transducer output bursts 122. This time interval is described in more detail below by way of an example illustrated in FIG. 5. Repeatability of the displacement measurement is enhanced by the suppression of switching power supply noise. Enhanced repeatability is described in more detail below by way of an example illustrated in FIG. 6.

According to one aspect, the transducer circuit 126 couples a first synchronization pulse along control bus 144 to the sequence circuit 140, and the sequence circuit 140 couples a switching control output 142 to the switching power supply 132. In this aspect of sequencing, the sequencing is initiated by the detection of at least a first portion of one transducer output burst 122. This aspect is described in more detail below by way of examples shown in FIGS. 2, 3, 3A and 4.

According to another aspect, the sequencing can alternatively be initiated by the switching power supply 132. According to this alternative aspect, the switching power supply 132 couples a switching control output 142 to the sequence circuit 140, and the sequence circuit 140 couples a second synchronization output along control bus 144 to the transducer circuit. According to this aspect, the switching is suppressed throughout a measurement interval, and the capacitor 130 has a large enough size to provide power throughout a measurement interval.

According to yet another aspect, the sequencing can alternatively be initiated by the sequence circuit 140. According to this alternative aspect, the sequence circuit 140 autonomously generates a first synchronization output on control bus 144 and switching control output 142.

According to one aspect, the suppressing of switching power supply noise improves signal to noise ratio in detecting the transducer output burst. Aspects of the transducer assembly 100 are described in more detail below by way of an example transducer assembly 200 illustrated in FIG. 2.

Figure 2:
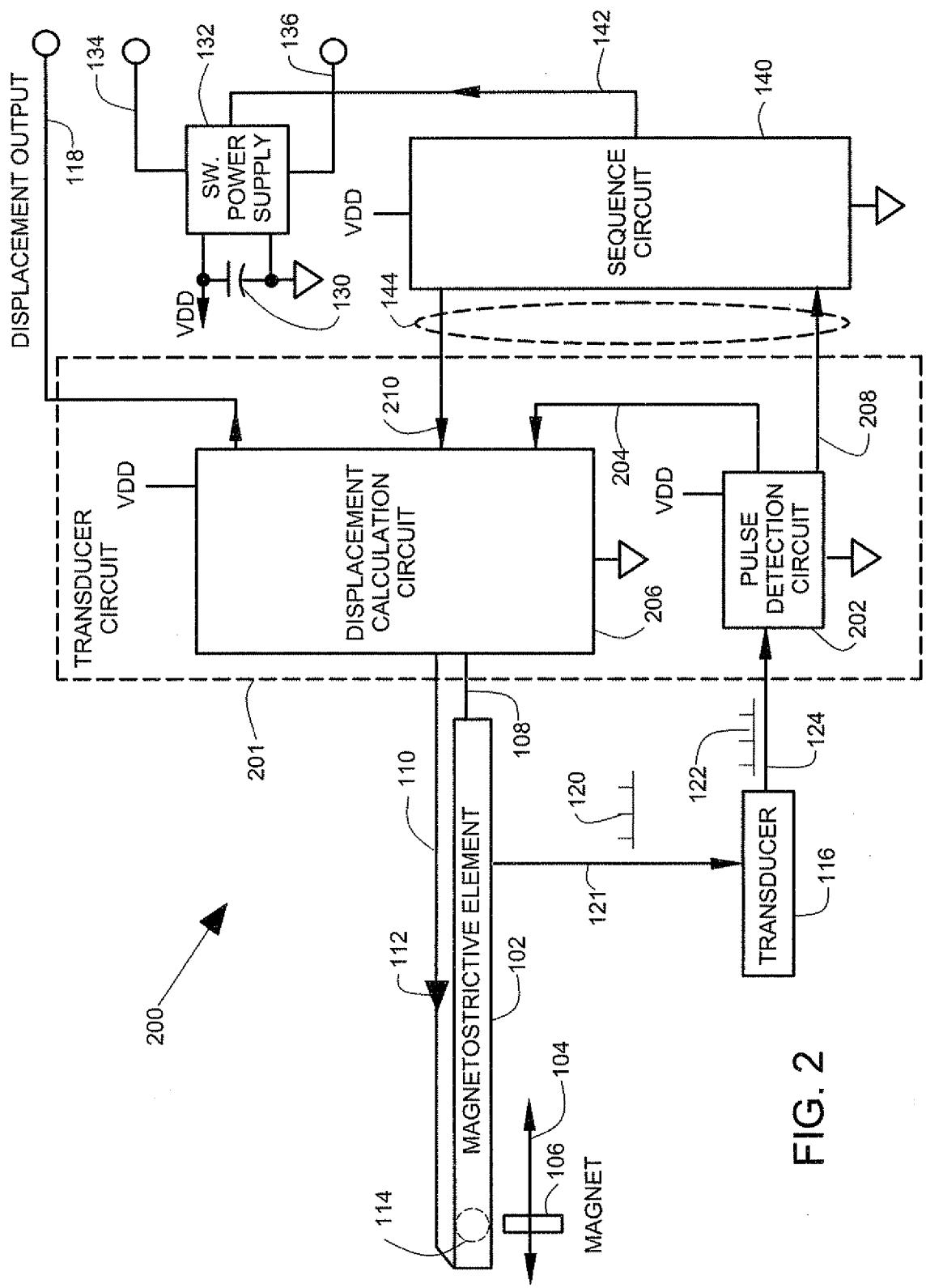
FIG. 2 illustrates a transducer assembly that includes a pulse detection circuit.

FIG. 2 illustrates a transducer assembly 200. The transducer assembly 200 is similar to the transducer assembly 100. For the sake of brevity, those reference numbers appearing in an earlier Figure that are the same as reference numbers appearing in a later Figure identify the same or similar features and their descriptions are not repeated.

In FIG. 2, a transducer circuit 201 (comparable to transducer circuit 126 in FIG. 1) comprises a pulse detection circuit 202. The pulse detection circuit 202 receives the transducer output bursts 122 on line 124. The pulse detection circuit 202 provides an amplified output 204. A displacement calculation circuit 206 receives the amplified output 204. The displacement calculation circuit 206 measures the timing of the transducer output bursts 122 relative to the timing of the current pulses 112. The displacement calculation circuit 206 calculates the displacement output 118 as a function of the relative timing and a known sonic velocity of pulse propagation along the magnetostrictive element 110. The sonic velocity can be determined from testing of the magnetostrictive element 102, or from calibration of the transducer circuit 201. The displacement calculation circuit 206 generates an output 118 representative of displacement.

The pulse detection circuit 202 provides a second amplified output 208 to a sequence circuit 140. The sequence circuit 140 detects an early portion of the transducer output burst 122, and this early portion triggers timing of a sequence of control outputs of the sequence circuit 140. The sequence circuit 140 provides a switching control output 142 that controls the switching power supply 132 to be in a suppressed mode. Next, the sequence circuit 140 provides a control output 210 to the displacement calculation circuit 206. The control output 210 defines a time window during which timing of a later portion of the burst can be detected. The switching power supply 132 is in a suppressed mode during this later portion of the burst such that switching power supply noise is not high enough to affect the timing measurement by the displacement calculation circuit 206. After the timing measurement is complete, then the switching power supply 132 is returned to an unsuppressed mode for operations which include charging the capacitor 130 and providing energization to the transducer circuit 201 and the sequence circuit 140. According to one aspect, the transducer 116, the transducer circuit 201 and the switching power supply 132 are disposed in close proximity within 150 millimeters of each other in a common housing. The close proximity increases interference noise from the switching power supply 132 to the pulse detection circuit 202, however, the suppression of the power supply 132 during timing measurement reduces interference when a timing measurement is made.

The operation of the transducer assembly 200 is described in more detail below by way of examples illustrated in FIGS. 3, 3A, 4, 5 and 6.

Figure 3:
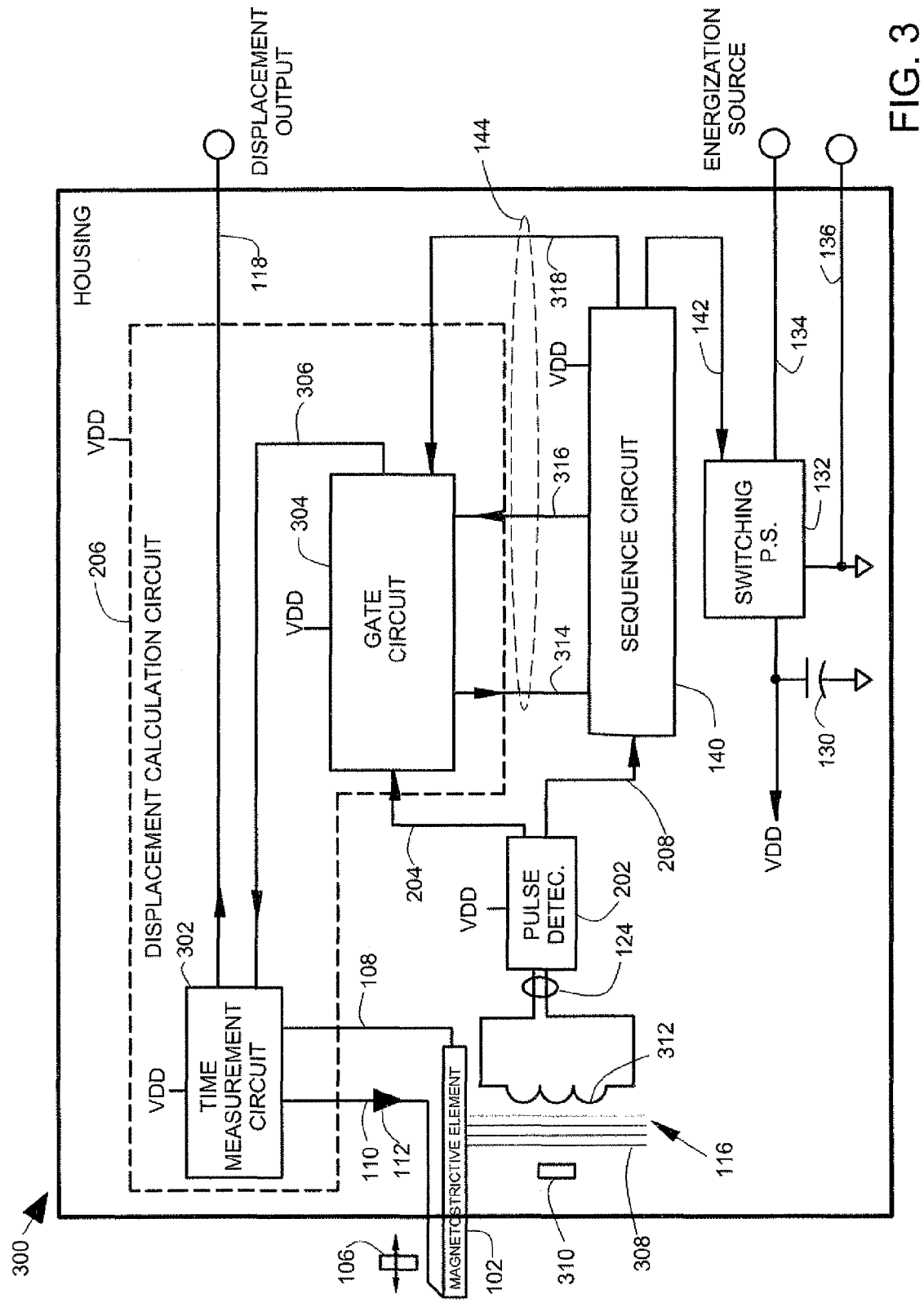
FIG. 3 illustrates a transducer assembly that includes a gate circuit.

FIG. 3 illustrates a transducer assembly 300. The transducer assembly 300 is similar to the transducer assembly 200 in FIG. 2. For the sake of brevity, those reference numbers appearing in FIG. 3 that are the same as reference numbers appearing in FIG. 2 identify the same or similar features and their description is not repeated here. In FIG. 3, a transducer 116 comprises a magnetic tape core 308, a bias magnet 310 and a magnetic pickup coil 312 that is wound around the core 308.

In FIG. 3, a displacement calculation circuit 206 comprises a time measurement circuit 302 that measures a delay time and that calculates and generates a displacement output 118 based on the delay time. The displacement calculation circuit 206 comprises a gate circuit 304. The gate circuit 304 is described in more detail below in an example illustrated in FIG. 4. The gate circuit 304 generates a gate circuit output 306 that couples to the time measurement circuit 302. The generation of the electric current pulse 112 starts a measurement time interval (also called measurement cycle) during which the time delay along the magnetostrictive element 102 is measured by the time measurement circuit 302.

In FIG. 3, a sequence circuit 140 receives an amplified output 208 from a pulse detection circuit 202. The sequence circuit 140 receives a gate output 314 from the gate circuit 304. The sequence circuit 140 provides a switching control output 142 to a switching power supply 132. The sequence circuit 140 provides sequence circuit outputs 316, 318 to the gate circuit 304. The sequence circuit inputs and outputs 314, 316, 318 are collectively called a control bus 144.

The function and timing of the gate circuit 304, the sequence circuit 140, and the control bus 144 are described in more detail below by way of an example shown in FIGS. 4, 5.

Figure 3A:
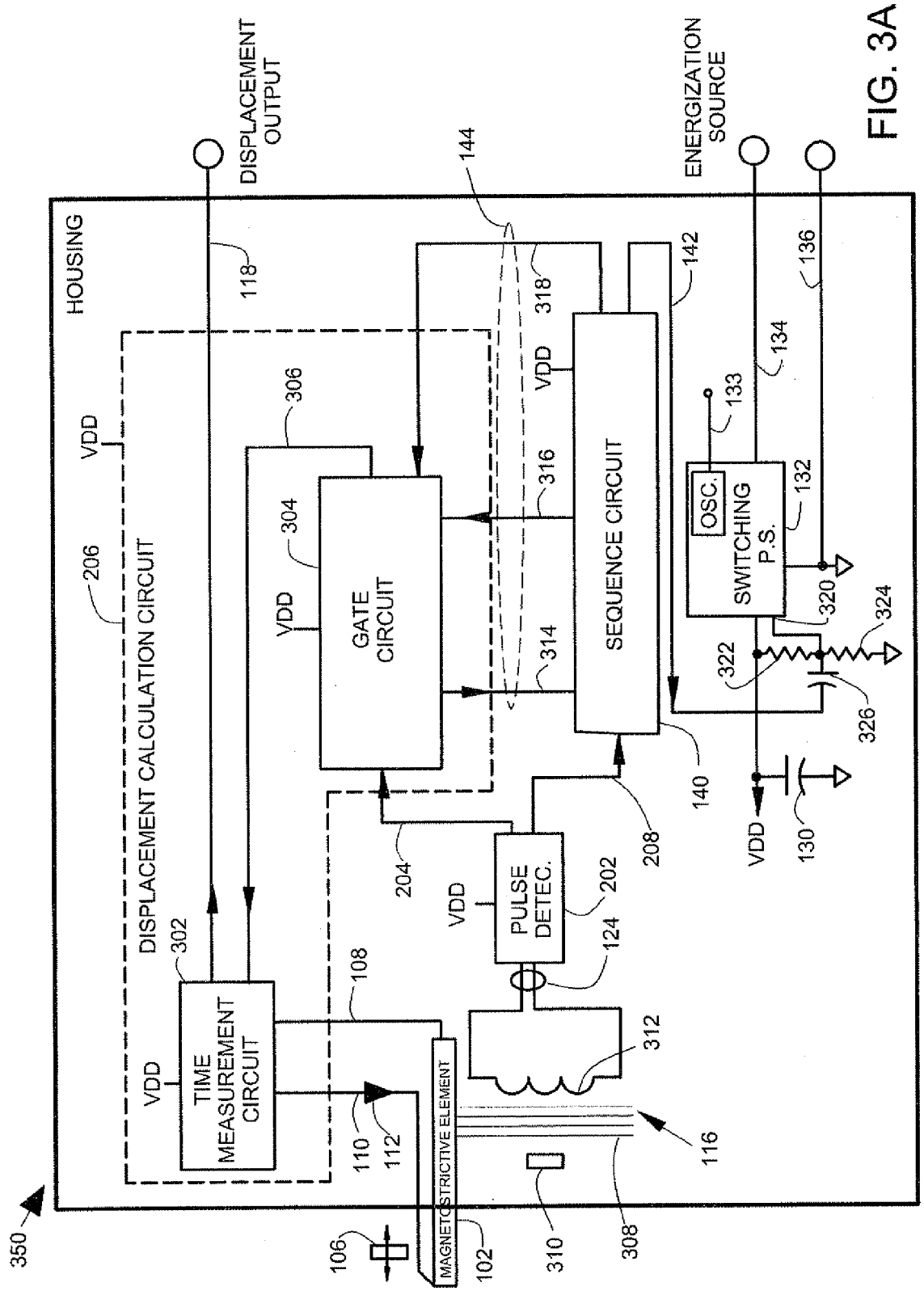
FIG. 3A illustrates a transducer assembly that includes a voltage divider.

FIG. 3A illustrates a transducer assembly 350. For the sake of brevity, those reference numbers appearing in FIG. 3A that are the same as reference numbers appearing in FIG. 3 identify the same or similar features and their description is not repeated here.

In FIG. 3A, a switching power supply 132 comprises a voltage feedback input 320 that couples to voltage divider resistors 322, 324. The voltage divider resistors 322, 324 provide a portion of the voltage VDD as feedback to the input 320 for regulating the DC level of VDD. The switching control output 142 capacitively couples a pulse through capacitor 326 to the voltage feedback input 320. The switching control output 142 temporarily increases the voltage at the voltage feedback input 320, causing the switching power supply 132 to temporarily suppress switching. The duration of the suppression time is a function of an RC time constant of the capacitor 326, the voltage divider resistors 322, 324 and a time width of a pulse on the switching control output 142. According to another aspect the switching control output 142 couples to an input of an output series pass transistor (not illustrated) in the switching power supply 132 to suppress switching. Other connections from the switching control output 142 to the switching power supply 132 that suppress switching can also be used.

According to one alternative aspect, the switching power supply 134 comprises an optional switching oscillator control input 133. The switching control output 142 can couple to the switching oscillator control input 133 to control switching frequency according to this alternative aspect.

Figure 4:
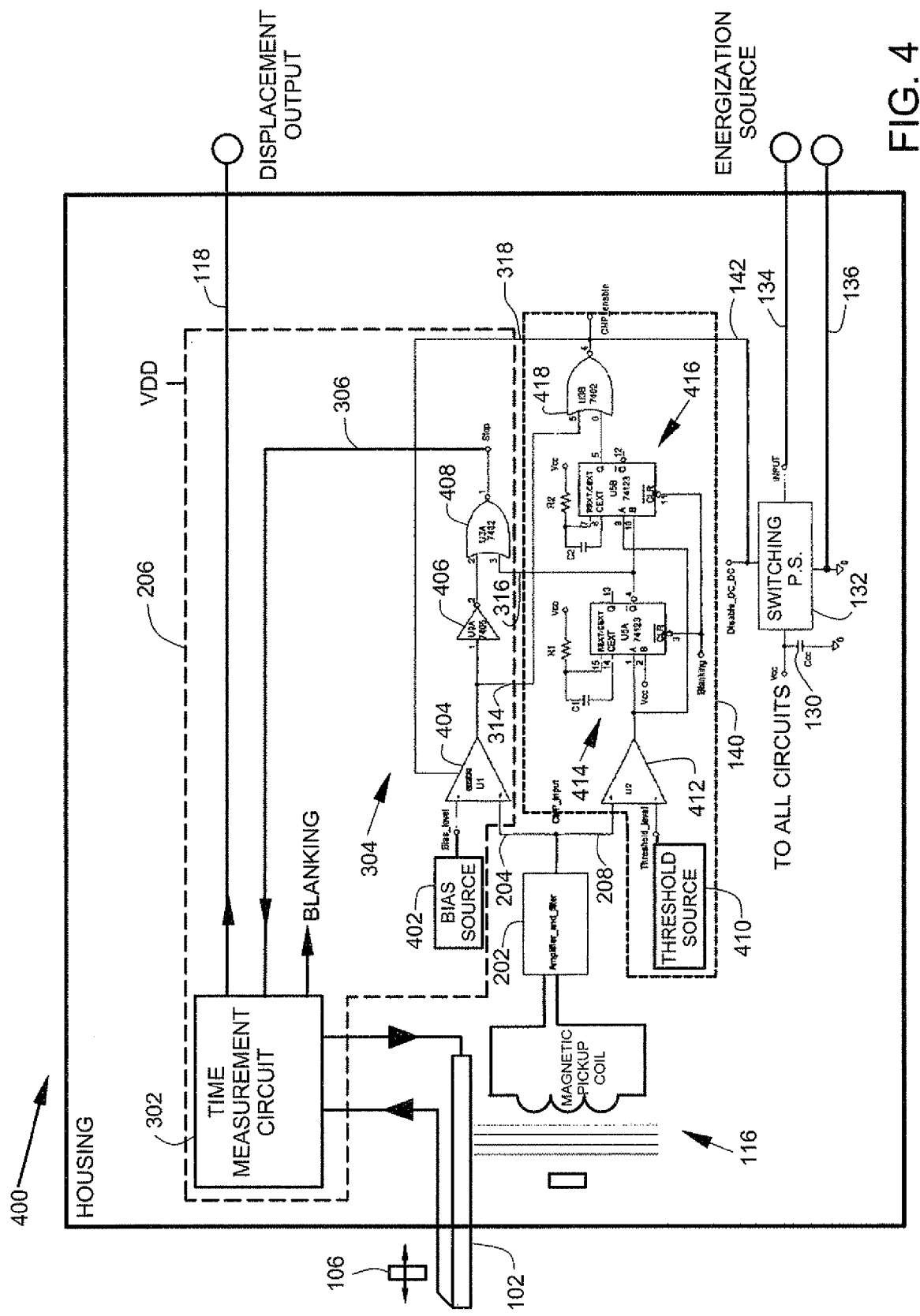
FIG. 4 illustrates a transducer assembly that includes one-shot circuits.

FIG. 4 illustrates a transducer assembly 400. For the sake of brevity, those reference numbers appearing in FIG. 4 that are the same as reference numbers appearing in FIG. 3 identify the same or similar features and their description is not repeated here.

In FIG. 4, a pulse detection circuit 202 comprises an amplifier and a filter and provides an amplified output 204 that is an amplified and filtered representation of a transducer output 124. A gate circuit 304 comprises a bias source 402, a comparator 404, an inverter 406 and a NOR gate 408. The comparator 404 (also called U1) compares a bias voltage from the bias source 402 to the amplified output 204. When the comparator 404 is enabled by sequence circuit output 318, the comparator 404 provides a gate output 314 that indicates whether the amplified output 204 is greater than the bias source 402. The gate output 314 of comparator 404 couples to an input of inverter 406. The inverter 406 provides an inverter output that couples to a first input of NOR gate 408. A second input of NOR gate 408 receives a sequence circuit output 316. An output of the NOR gate 408 provides a gate circuit output 306 that couples to the time measurement circuit 302.

In FIG. 4, a sequence circuit 140 comprises a fixed threshold source 410, a comparator 412, a first one-shot circuit 414, a second one-shot circuit 416 and a NOR gate 418. The threshold source 410 couples a threshold voltage level to a first input of the comparator 412. An amplified output 208 from a pulse detection circuit 202 couples to a second input of the comparator 412. The comparator 412 generates a comparator output that couples to "A" inputs of first and second one-shot circuits 414, 416. The output of comparator 412 switches when the amplified output 208 passes the threshold voltage level. According to one aspect, the one-shot circuits 414, 416 comprise a dual retriggerable one-shot type 74×123 available from National Semiconductor Corporation of Arlington, Tex. USA, as well as from other integrated circuit manufacturers. The first one-shot circuit 414 is connected to a first RC circuit R1-C1 to function as a first timer with a first time constant. The second one-shot circuit 416 is connected to a second RC circuit R2-C2 to function as a second timer with a second time constant.

A /Q (also called "NOT Q") output of the first one-shot circuit 414 generates a sequence circuit output 316. A Q output of the second one-shot circuit couples to a first input of the NOR gate 418. The gate output 314 from the gate circuit 304 couples to a second input of the NOR gate 418. An output of the NOR gate 418 generates a sequence circuit output 318 and a switching control output 142. The switching control output 142 couples to the switching power supply 132 to suppress switching. The operation of the sequence circuit 140 and the gate circuit 304 are described in more detail below in connection with an exemplary timing diagram illustrated in FIG. 5.

Figure 5:
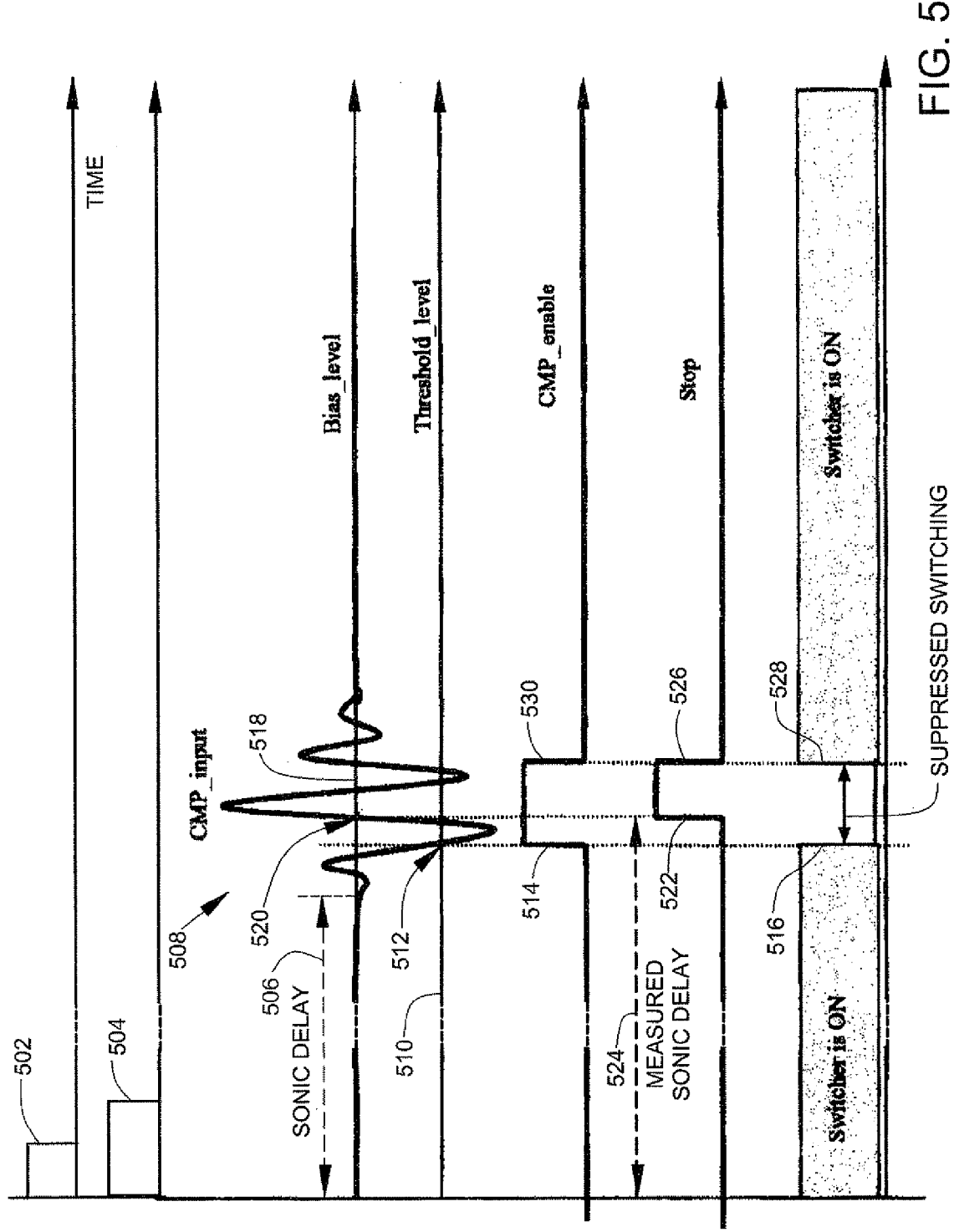
FIG. 5 illustrates a timing diagram associated with a transducer assembly illustrated in FIG. 4.

FIG. 5 illustrates an exemplary timing diagram for the circuitry illustrated in FIG. 4. Time axes in FIG. 5 are represented by horizontal lines, and multiple outputs and conditions are illustrated vertically along the time axes. The portion of time shown in FIG. 5 is illustrative of a measurement cycle starting at a starting time on the left side of the timing diagram.

In FIGS. 4-5, a current pulse 502 (FIG. 5) is applied to the magnetostrictive element 102, starting the measurement cycle. A time measurement circuit 302 (FIG. 4) generates a blanking pulse 504 (FIG. 5). The blanking pulse 504 is coupled to /CLEAR (also called "NOT CLEAR") inputs the one-shots 414, 416 to ensure that the one-shots 414, 416 are cleared and ready to be triggered in order to suppress switching when a time measurement is ended.

After a variable sonic time delay 506 (dependent on a displacement of magnet 106), a burst (also called a ringing pulse) 508 is present at the amplified outputs 204, 208. When the ringing pulse 508 first exceeds a threshold level 510 at time 512, then the switching control output 142 and the sequence circuit output 318 (also called CM_enable) switch to a high state at time 514 and the switching power supply 132 is suppressed at time 516.

When the ringing pulse 508 exceeds the bias level 518 at time 520, then the gate circuit output 306 (also called Stop) changes at a time 522. The gate circuit output 306 couples to the time measurement circuit 302 and stops counting a measured sonic delay 524 in the time measurement circuit 302 at time 520. The measured sonic delay 524 typically differs from the sonic delay 506 by a substantially fixed time interval, and this substantially fixed time difference is cancelled out of the output during calibration so that the displacement output 118 is accurate.

At a time 530 CMP_enable switches low, and at a time 526, gate circuit output 306 (Stop) switches low, and at a time 528 the switching power supply 132 is returned to unsuppressed switching again. The critical measurement of time 520 is made when the switching power supply is momentarily suppressed and not producing high levels of switching power supply noise.

It is understood by those skilled in the art that a timing diagram, such as the timing diagram in FIG. 5 is a simplified representation and does not show all noise and other artifacts that may be present at various outputs.

Figure 6:
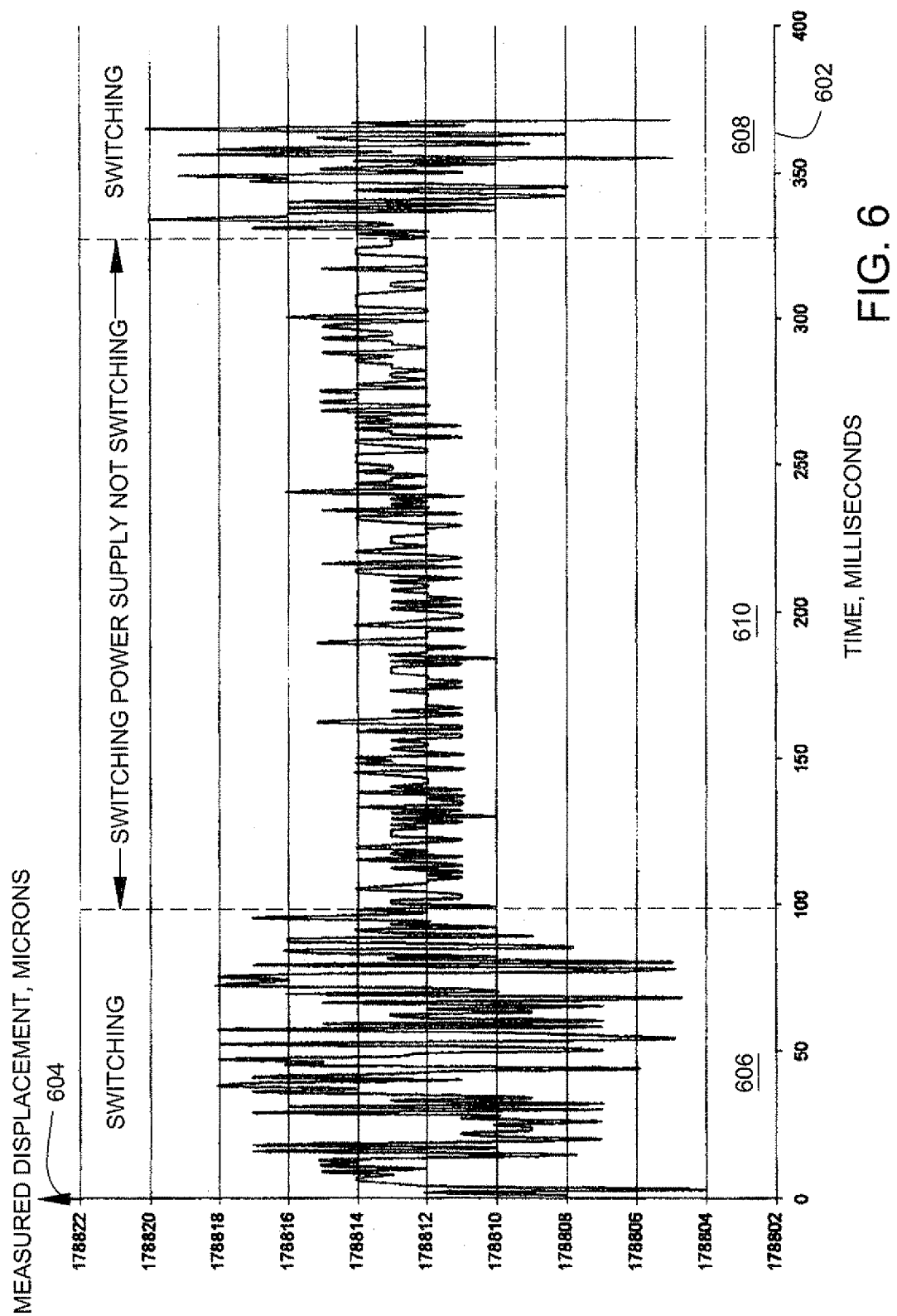
FIG. 6 illustrates switching noise on a displacement output of a transducer assembly.

FIG. 6 illustrates a displacement output (such as displacement output 118 in FIG. 4) that includes switching noise. In FIG. 6, a horizontal axis 602 represents time in milliseconds, and a vertical axis 604 represents measured displacement in microns. In FIG. 6, a switching power supply in ON during time intervals 606, 608, and switching of the switching power supply is suppressed during a time interval 610. In FIG. 6, a magnet (such as magnet 106) is in a fixed position. It can be seen by inspection of FIG. 6, that displacement noise can be as high as 15 microns peak-to-peak when the switching power supply is unsuppressed during time intervals 606, 608. It can also be seen by inspection of FIG. 6 that displacement switching noise is reduced to about 2-3 microns peak-to-peak when the switching is temporarily suppressed during time interval 610. Significant signal to noise ratio improvement is accomplished when the displacement measurement is made with the switching temporarily suppressed. A more stable reading of displacement is provided even though a switching power supply is housed with a transducer circuit.

Figure 7:
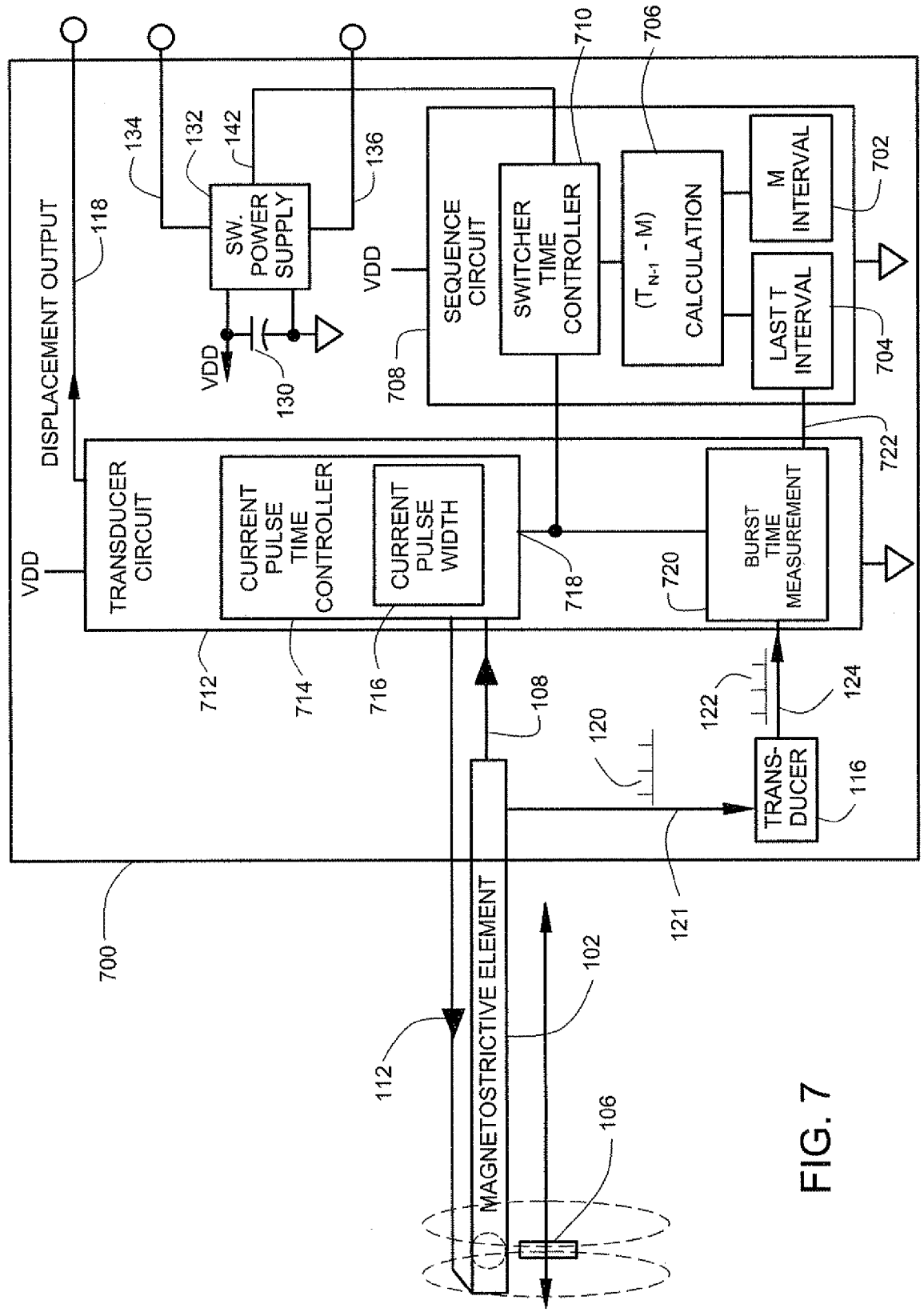
FIG. 7 illustrates a block diagram of a transducer assembly.

FIG. 7 illustrates a block diagram of a transducer assembly 700. The transducer assembly 700 is similar to the transducer assembly 200 illustrated in FIG. 2. Reference numbers used in FIG. 7 that are the same as reference numbers used in FIG. 2 represent the same or similar features in both FIG. 2 and FIG. 7. In the transducer assembly 200 of FIG. 2, repetitive suppressed states of the switching power supply 132 are controlled as a function of repetitive detecting of the transducer output bursts 120. In the transducer assembly 700 of FIG. 7, however, repetitive suppressed states of the switching power supply 132 are controlled (as illustrated in the timing diagram of FIG. 8) as a function of a calculated difference $(T_{N-1}-M)$ 706 between a fixed time interval (M) 702 and a measurement cycle time interval (LAST T) 704 from a previously completed measurement cycle time.

The transducer assembly 700 comprises a sequence circuit 708. The sequence circuit 708 comprises the stored, preset value of the time interval M at 702, the stored, updated last time interval T at 704, a calculation circuit at 706 that calculates $(T_{N-1}-M)$ and a switcher time controller 710 that controls suppression of switching in a switching power supply 132.

The transducer assembly 700 comprises a transducer circuit 712. The transducer circuit 712 comprises a current pulse time controller 714. The current pulse time controller 714 comprises a stored, present current pulse width value 716. The current pulse time controller produces a current pulse 112 when triggered by a triggering signal at a trigger input 718. The transducer circuit 712 comprises a burst time measurement circuit 720 that receives transducer bursts on line 124. The burst time measurement circuit 720 provides updates along line to the stored last T interval 704 at the end of each measurement cycle. The burst time measurement circuit 720 provides a trigger signal to the input 718 of the current pulse time controller 714 and to the switcher time controller 710. A displacement output 118 is calculated as a function of burst time measurement from the burst time measurement circuit 720. The operation of the transducer assembly 700 is explained in more detail below by way of an example timing diagram in FIG. 8 and an exemplary flow chart in FIG. 9.

Figure 8:
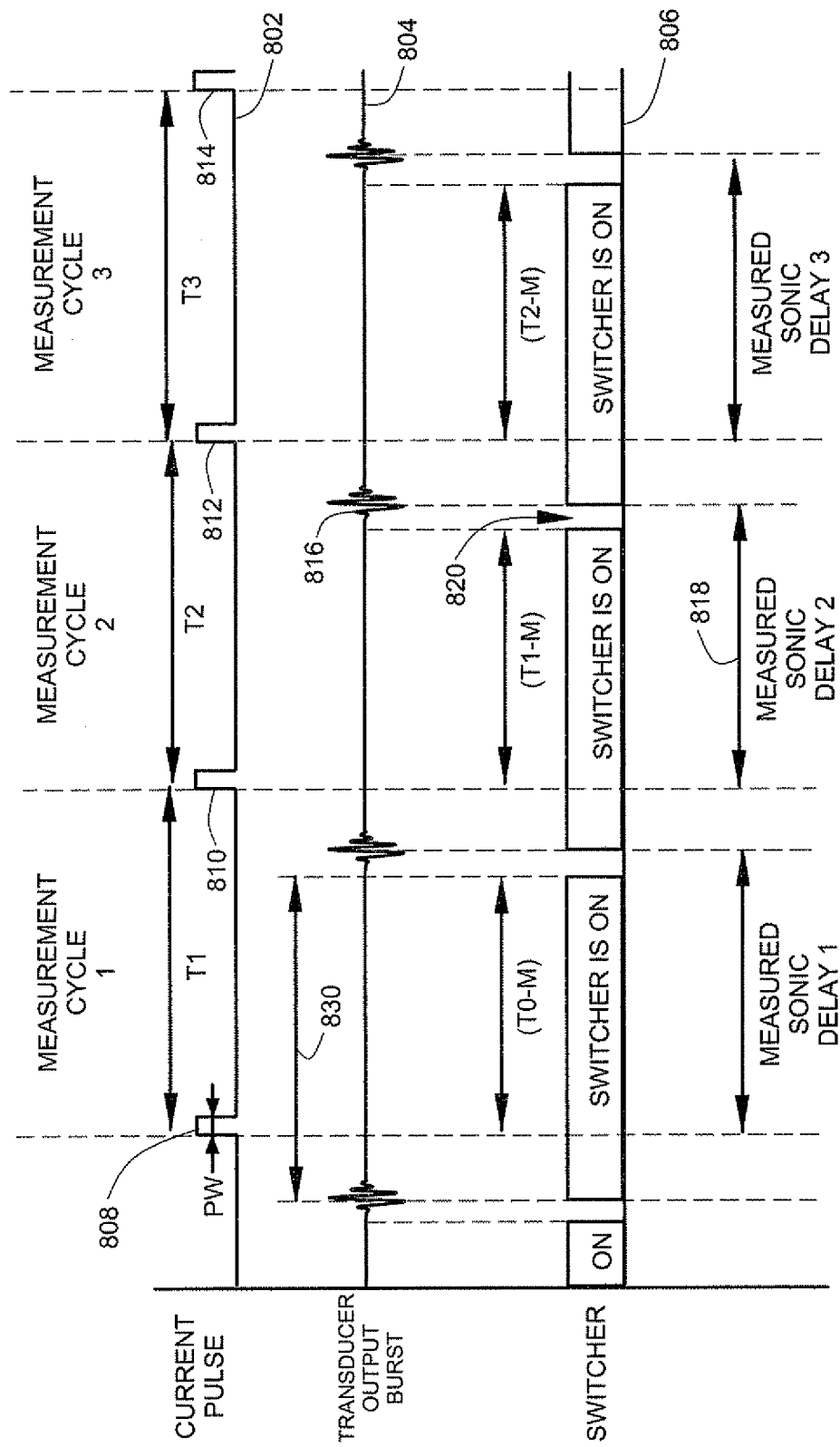
FIG. 8 illustrates a timing diagram associated with a transducer assembly illustrated in FIG. 7.

FIG. 8 illustrates an exemplary timing diagram associated with a transducer assembly illustrated in FIG. 7. The horizontal axes 802, 804, 806 represent time. Current pulses 808, 810, 812, 814 are generated by the current pulse time controller 714 (FIG. 7). Each of the current pulses 808, 810, 812, 814 has a fixed current pulse width PW that is set by the stored current pulse width value 716 (FIG. 7). The timing of the current pulses 808, 810, 812, 814 define measurement cycles. A measurement cycle comprises a time interval that runs from a start of a first current pulse that is in the measurement cycle to a start of a subsequent second current pulse. As illustrated in FIG. 8, three full measurement cycles 1, 2 and 3 are illustrated.

In each measurement cycle, after a sonic delay, a transducer burst is produced responsive to the current pulse. The current pulse 810 at a start of measurement cycle 2, for example, results in a transducer burst 816 after a sonic delay 818. The transducer burst 816 is in the measurement cycle 2. After each detection of an output burst (such as output burst 816, switching of the switching power supply is resumed. At the beginning of each measurement cycle, the switching power supply 132 (FIG. 7) is switching to provide charge to capacitor 130 (FIG. 7). The switching power supply 132 is permitted to switch, as needed to maintain charge on capacitor 130 in measurement cycle N for a time interval ($T_{N-1}$–M), where $T_{N-1}$ is a time length of an immediately preceding measurement cycle N–1, and M is a fixed time interval set by stored time interval value 702 (FIG. 7). The time length ($T_{N-1}$–M) starts at a start of a current pulse. The switching power supply 132 switches for a cycle time 830 from a detection of an output burst until the end of the time length ($T_{N-1}$–M) after the start of a current pulse.

For example, in measurement cycle 2 (N=2), the switching power supply 132 ("switcher") is permitted to continue switching for a time interval (T1–M) after the start of measurement cycle 2. The value of M is selected to stop switching and provide a suppressed switching time interval 820. The suppressed switching time interval 820 starts before the transducer burst 816 so that switching noise is suppressed when the timing of the transducer burst 816 is detected. As soon as the transducer burst 816 is detected, then the switching of the power supply resumes.

After the timing of transducer burst 816 is detected, the next measurement cycle starts. According to one aspect, the length of measurement cycles is variable and depends on the sonic delays encountered. It is understood that the length of the sonic delay is a function of mechanical motion of the magnet 106 (FIG. 7) and that changes in the sonic delay occur slowly (relative to the time length of a measurement cycle) due to limited velocity of the magnet 106. The length of an immediately preceding measurement cycle is thus a good approximation of a length of a current measurement cycle, which is not precisely known yet at a start of the current measurement cycle. This good approximation ensures that a suppressed switching time interval starts before a transducer burst.

Figure 9:
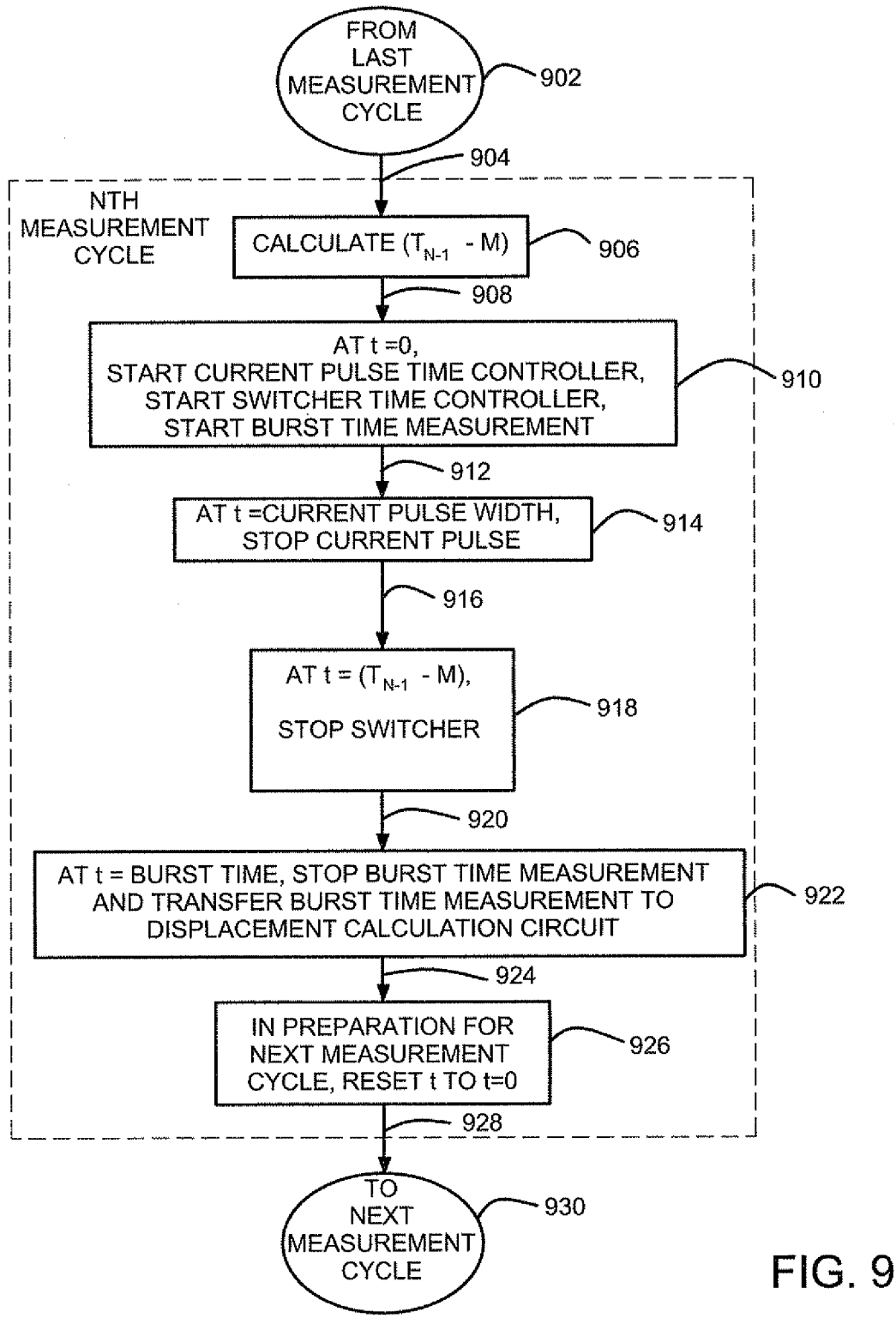
FIG. 9 illustrates a flow chart associated with the transducer assembly illustrated in FIG. 7.

FIG. 9 illustrates a flow chart associated with the transducer assembly 700 illustrated in FIG. 7. The flow chart in FIG. 9 illustrates processing during a measurement cycle N. Processing starts at the end of a previous measurement cycle 902. Processing continues along line 904 to action block 906. At action block 906, the time interval ($T_{N-1}$–M) is calculated. After completion of action block 906, processing continues along line 908 to action block 910.

At action block 910, the current pulse controller 714, the switcher time controller 710 and the burst time measurement circuit 720 are triggered at time t=0. The current pulse starts at time t=0, switching of the switching power supply 132 starts at time t=0 and measurement of the sonic delay starts at time t=0. After completion of action block 910, processing continues along line 912 to action block 914. At action block 914, the current pulse shuts off at time t=current pulse width 716. After completion of action block 914, processing continues along line 916 to action block 918.

At action block 918, the switching of the switching power supply is shut off at t=($T_{N-1}$–M). After time t=($T_{N-1}$–M) and for the remainder of the Nth measurement cycle, switching is suppressed in the switching power supply. After completion of action block 918, processing continues along line 920 to action block 922.

At action block 922, the burst time measurement is stopped at t=burst time. The burst time measurement is transferred to calculate the displacement output 118. The burst time measurement is transferred to the last T interval storage at 704. After completion of action block 922, processing continues along line 924 to action block 926.

At action block 926 the time t is reset to t=0 in preparation for the next measurement cycle. After completion of action block 926, processing continues along line 928 to the next measurement cycle 930.

As described above in FIGS. 7, 8 and 9, a transducer 116 senses repetitive pulses on a magnetostrictive element 102 and provides transducer output bursts 122 on line 124. The transducer assembly 700 comprises a transducer circuit 712. The transducer circuit 712 repetitively detects the transducer output bursts 122 and provides an output 118 representative of displacement.

The transducer assembly 700 comprises an energy storage device 130. The energy storage device 130 couples to a power input VDD of the transducer circuit 712. The transducer assembly 700 comprises a switching power supply 132. The switching power supply 132 couples to the energy storage device 130. The switching power supply 132 has repetitive suppressed states (such as during time interval 820) during which switching in the switching power supply 132 is suppressed.

The transducer assembly 700 comprises a sequence circuit 708. The sequence circuit 708 couples to the switching power supply 132 and to the transducer circuit 712. The sequence circuit 708 provides synchronization of the repetitive suppressed states of the switching power supply 132 with the transducer output bursts 122 on line 122.

Although the subject matter has been described in language specific to structural features and/or methodological acts, it is to be understood that the subject matter defined in the appended claims is not limited to the specific features or acts described above as has been held by the courts. Rather, the specific features and acts described above are disclosed as example forms of implementing the claims.

What is claimed is:

1. A transducer assembly, comprising:
   a magnetostrictive displacement sensing element;
   a transducer that provides transducer output bursts that represent repetitive pulses on the magnetostrictive displacement sensing element that is adjacent to the transducer;
   a transducer circuit that repetitively detects the transducer output bursts, the transducer circuit comprising:
      a pulse detection circuit that receives the transducer output bursts and that provides an amplified output; and a displacement calculation circuit that receives the amplified output and that generates an output representative of displacement;

an energy storage device coupled to a power input of the transducer circuit;

a switching power supply that couples to the energy storage device and that has repetitive suppressed states during which switching in the switching power supply is suppressed;

a sequence circuit that couples to the switching power supply and to the transducer circuit, the sequence circuit providing synchronization of the repetitive suppressed states of the switching power supply with the repetitive detecting of the transducer output bursts; and wherein the pulse detection circuit outputs a second amplified output to the sequence circuit, and the sequence circuit outputs a switching control output to the switching power supply after the pulse detection circuit detects a first portion of one of the transducer output bursts.

2. The transducer assembly of claim 1 wherein the synchronization suppresses switching power supply noise during a time interval in which the transducer circuit detects the transducer output bursts.

3. The transducer assembly of claim 2 wherein the switching power supply outputs a switching control output to the sequence circuit, and the sequence circuit outputs a synchronization signal along a control bus to the transducer circuit.

4. The transducer assembly of claim 1 wherein the sequence circuit comprises a switcher time controller that controls the suppressed states as a function of a difference between a past measurement cycle time and a fixed time interval.

5. The transducer assembly of claim 1 wherein the energy storage device energizes the transducer circuit during the repetitive suppressed states.

6. The transducer assembly of claim 1 wherein the sequence circuit outputs a sequence circuit output to the displacement calculation circuit after the pulse detection circuit detects a second portion of a transducer output burst.

7. The transducer assembly of claim 1 wherein the switching power supply comprises a disable input that receives the switching control output.

8. The transducer assembly of claim 1 wherein the switching power supply comprises a voltage feedback input that receives the switching control output.

9. The transducer assembly of claim 1 wherein the switching power supply comprises a switching oscillator control input that receives the switching control output.

10. The transducer assembly of claim 1 wherein the energy storage device has an energy storage capacity sufficient to energize the transducer circuit during a single transducer output burst.

11. The transducer assembly of claim 1 wherein the energy storage device has an energy storage capacity sufficient to energize the transducer circuit through a time interval between two successive transducer output bursts.

12. The transducer assembly of claim 1 wherein the transducer, the transducer circuit and the switching power supply are disposed within 150 millimeters of each other within a housing.

13. A method of transducing displacement, comprising:
using a transducer to provide transducer output bursts representing repetitive pulses on a magnetostrictive displacement sensing element that is adjacent to the transducer;

repetitively detecting the transducer output bursts with a transducer circuit, and providing the transducer circuit with a pulse detection circuit that provides an amplified output to a displacement calculation circuit in the transducer circuit, the displacement calculation circuit generating an output representative of displacement;

energizing the transducer circuit with an energy storage device and a switching power supply;

providing the switching power supply with repetitive suppressed states during which switching in the switching power supply is suppressed;

synchronizing the repetitive suppressed states of the switching power supply with the repetitive detecting of the transducer output bursts; and outputting a second amplified output from the pulse detection circuit to a sequence circuit that outputs a switching control output to the switching power supply.

14. The method of claim 13 wherein the synchronizing suppresses switching power supply noise during a time interval in which the transducer circuit detects the transducer output bursts.

15. The method of claim 13 and outputting a switching control output from the switching power supply to the sequence circuit, and the sequence circuit outputting a synchronization signal along a control bus to the transducer circuit.

16. The method of claim 13 and the energy storage device energizing the transducer circuit during the repetitive suppressed states.

17. A transducer assembly, comprising:
a transducer that provides transducer output bursts that represent repetitive pulses on a magnetostrictive displacement sensing element adjacent the transducer;

an energy storage device;

a switching power supply that couples to the energy storage device and that has repetitive suppressed states during which switching in the switching power supply is suppressed; and a transducer circuit that has a power input that couples to the energy storage device, and the transducer circuit repetitively detects the transducer output bursts with a pulse detection circuit that provides an amplified output, and the transducer circuit includes a displacement calculation circuit that receives the amplified output and that provides an output representative of displacement, the repetitive suppressed states being synchronized with the transducer output bursts; and a sequence circuit, and wherein the pulse detection circuit outputs a second amplified output to the sequence circuit, and wherein the sequence circuit outputs a switching control output to the switching power supply.

18. A transducer assembly, comprising:
a transducer that provides transducer output bursts that represent repetitive pulses on a magnetostrictive displacement sensing element adjacent the transducer;

an energy storage device;

a switching power supply that couples to the energy storage device and that has repetitive suppressed states during which switching in the switching power supply is suppressed; and transducer circuit means for repetitively detecting the transducer output bursts when the switching power supply is in a suppressed state and for providing an output representative of displacement, the transducer circuit means comprising a pulse detection circuit receiving the transducer output bursts and providing an amplified output, and the transducer circuit means including a displacement calculation circuit that receives the amplified output and that generates the output representative of displacement; and a sequence circuit, wherein the pulse detection circuit outputs a second amplified output to the sequence circuit, the sequence circuit outputting a switching control output to the switching power supply after the pulse detection circuit detects a first portion of a transducer output burst.

* * * * *